(No Model.)

2 Sheets—Sheet 1.

M. SWENSON.
CONCENTRATING PAN.

No. 353,515. Patented Nov. 30, 1886.

Witnesses:
William F. Davis
William D. Conner

Inventor:
Magnus Swenson
by his Attorneys
Howson and Sons (No Model.) 2 Sheets—Sheet 2.

M. SWENSON.
CONCENTRATING PAN.

No. 353,515. Patented Nov. 30, 1886.

Witnesses:
William F. Davis
William D. Conner

Inventor:
Magnus Swenson
by his Attorneys
Howson and Sons

UNITED STATES PATENT OFFICE.

MAGNUS SWENSON, FORT SCOTT, KANSAS.

CONCENTRATING-PAN.

SPECIFICATION forming part of Letters Patent No. 353,515, dated November 30, 1886.

Application filed May 3, 1886. Serial No. 200,919. (No model.)

*To all whom it may concern:*

Be it known that I, MAGNUS SWENSON, a citizen of the United States, residing at Fort Scott, Kansas, have invented certain Improvements in Concentrating-Pans, of which the following is a specification.

One object of my invention is to so construct a vacuum concentrator or evaporating-pan as to prevent exposure of the surface of the heating-pipes to the vapor of low temperature arising from the liquid which is being treated in the pan, another object being to permit the maintenance of a vacuum in all the chambers of a multiple-chamber pan with the use of but a single exhaust-pipe, a further object being to provide for the working of the chambers of a multiple-chamber pan, either in a continuous series or independently, and a still further object being to provide facilities for the ready inspection or repair of any of the heating-pipes of the pan without arresting the operation of the pan for any material length of time.

Figure 1:
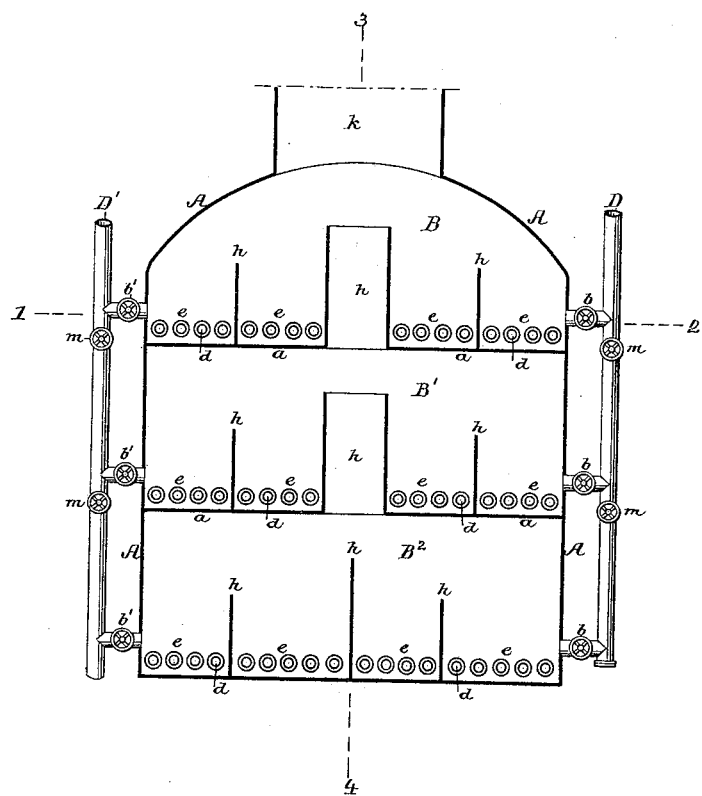
Figure 2:
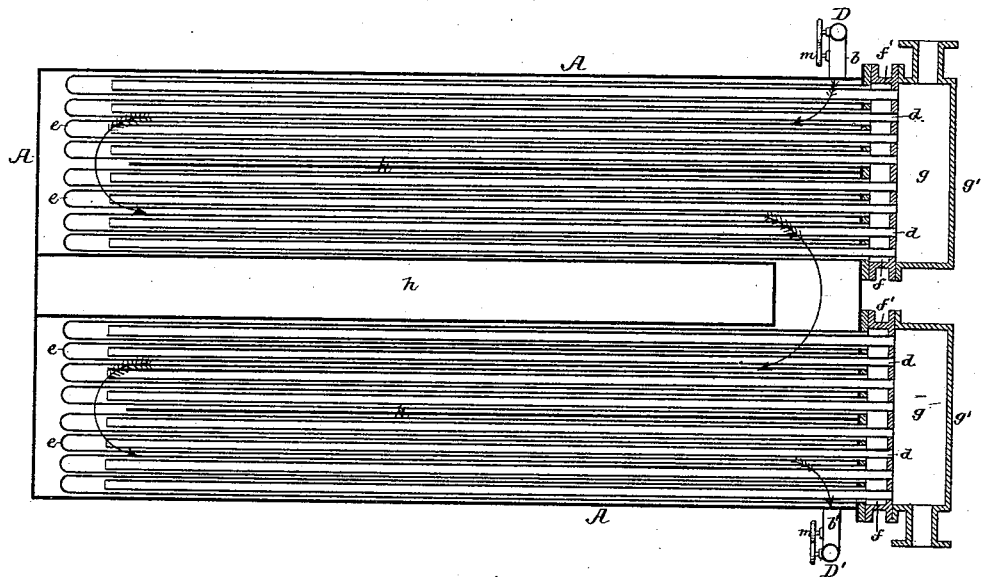
Figure 3:
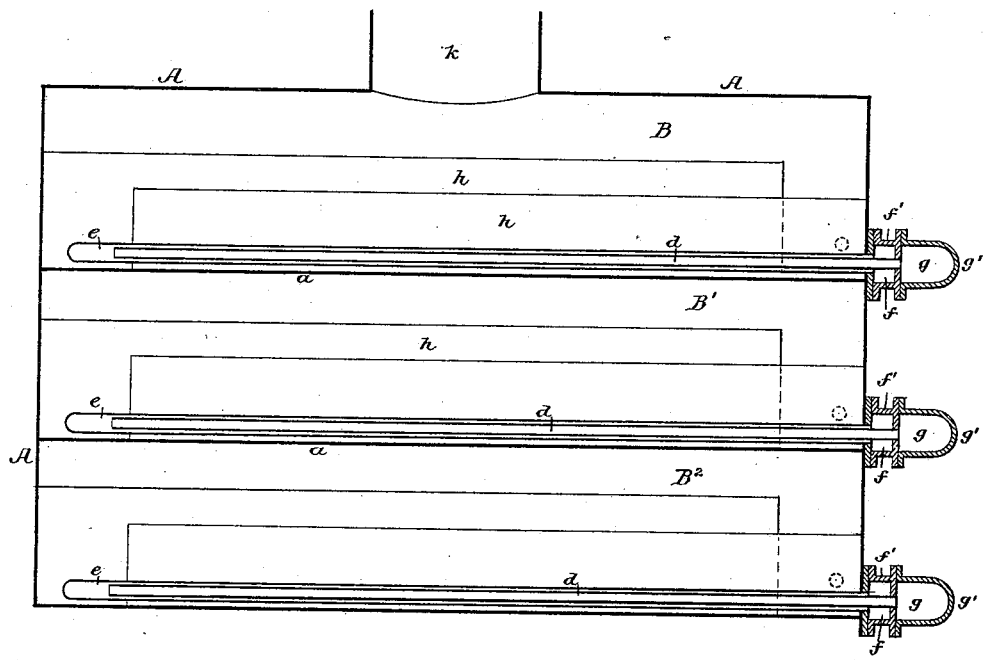

In the accompanying drawings, Figure 1 is a transverse section of a concentrating or evaporating pan constructed in accordance with my invention. Fig. 2 is a sectional plan view on the line 1 2, Fig. 1; and Fig. 3 is a longitudinal section on the line 3 4, Fig. 1.

A is the outer casing of the pan, which in the present instance is divided by two horizontal partitions, $a\ a$, into three compartments or chambers, B B' B², one above another, although it should be understood that my invention is not limited in this respect, as any desired number of compartments may be used.

At one side of the pan is a pipe, D, which communicates through a valved branch, $b$, with each of the chambers of the pan, a similar pipe, D', at the opposite side of the pan having like valved branches, $b'$, communicating with the different chambers.

At or near the bottom of each chamber of the pan is arranged a series of heating-pipes, $e$, each of which has an internal tube, $d$, said pipes $e$ being closed at the inner ends and communicating at their outer ends with a chamber, $f$, formed in a box or casing, $f'$, secured to the front of the shell or casing A of the pan. The tubes $d$ are open at both ends, the outer ends of the tubes communicating with a chamber, $g$, in a box or casing, $g'$, which is in communication with any source of steam-supply, so that steam from the chamber $g$ is permitted to pass through the tubes $d$ to the inner ends of the pipes $e$, and thence through the latter in a reverse direction to the chamber $f$, in which the water of condensation is collected, and from which said water of condensation can be withdrawn through any suitable system of drip-pipes.

It will be observed that each pipe $e$ and each tube $d$ is confined at one end only, so that the free longitudinal expansion and contraction of said pipes and tubes is permitted without affecting the security of their connections.

In each of the chambers of the pan are longitudinal partitions $h$, which serve to form in each chamber a circuitous conduit or passage communicating at one end with a supply-pipe and at the opposite end with a discharge-pipe, so that the liquor entering the chamber at one side through one of the branches, $b$, of the pipe D is compelled to take a circuitous course and traverse the entire area of the chamber before it can escape from the opposite side of the same through the branch $b'$.

The central partitions, $h$, of the upper and intermediate sections, B B', of the pan are hollow, so as to form flues through which the vapors from the intermediate and lower sections can escape to the discharge $k$, if the pan is in communication with an air-pump and condenser similar to those of an ordinary vacuum-pan.

Each of the pipes D D' has between its branches valves $m$, and by manipulating these valves and the valves in the branches $b\ b'$ the flow of liquor through the pan can be regulated as desired. If, for instance, it is desired that the liquor shall flow through the chambers B, B', and B² in succession, the valves in all the branches $b\ b'$ may be left open, the upper valve, $m$, in the pipe D and the lower valve in the pipe D', however, being closed. The liquor will then pass through the upper chamber, B—say from right to left—then down through the pipe D' into the chamber B', through which it will pass from left to right, and thence down through the pipe D into the lower chamber, B², through which it passes from right to left, and escapes finally through the pipe D'; or each chamber of the pan may be worked independently of the others by so manipulating the valves as to provide each chamber with an independent supply and discharge.

The pipes e are preferably of small diameter, and the mouths of the branches b b' are but a short distance above said pipes, so that the level of liquor maintained in each chamber of the pan is but little higher than the tops of the pipes e, this being a desirable feature in a concentrating-pan, for it has been demonstrated by experiment that the concentration of the liquors can be effected much more rapidly and economically when said liquors are caused to flow in a shallow stream over the heating-pipes or other surfaces than when the volume of liquor under treatment is dependent upon the depth of liquor in a pan of limited cross-sectional area, such as an ordinary vacuum-pan. I have also found by experiment that when the fresh liquor is introduced at one end of a long passage or conduit, such as that formed by the partitioned chamber of my improved pan, and withdrawn from the opposite end of said passage or conduit, a natural current will be established, the liquor showing a constantly-increasing percentage of concentration at different points in its progress through said passage or conduit.

As the heating-pipes are submerged in the liquor, the vapor rising from the latter will not have its temperature increased by contact with the heating-surfaces, as in other vacuum-concentrators with which I am familiar, and hence said vapor can be condensed with a much less amount of water than would be required if the temperature of the vapor were increased to any material extent, while on the other hand there is not that rapid condensation of steam which results when part of the surface of the steam-heating pipes is exposed to the vapor in the vacuum-chamber of the pan, which vapor is of much lower temperature than the heating-pipes.

Owing to the construction adopted, my improved pan is practically a sectional pan, any set of tubes in which there may exist a defect being readily removable from the pan for inspection or repairs without causing a long-continued cessation in the operation of the pan.

I claim as my invention—

1. The combination, in a concentrating-pan, of the casing having a discharge-pipe communicating with the exhauster, a vacuum-chamber contained in said casing and forming a passage for the liquid to be concentrated, heating-pipes near the bottom of said chamber, an inlet-pipe for the liquid, and an outlet-pipe therefor having a mouth above the level of the heating-pipes, all substantially as specified.

2. The combination, in a concentrating-pan, of the casing containing a series of chambers, one above another, a pipe through which the upper chamber communicates with the exhauster, flues through which each of the lower chambers is placed in communication with that above, and liquid supply and discharge pipes for each chamber, all substantially as specified.

3. The combination, in a concentrating-pan, of the casing containing a series of chambers, heating-pipes in each chamber, a liquid-supply pipe and a discharge-pipe, each communicating with each chamber, and valves in said pipes, whereby liquid may be caused to pass through the chambers in succession, or through each of the chambers independently of the others, all substantially as specified.

4. The combination, in a concentrating-pan, of the closed casing containing a series of chambers, each having heating-pipes, with boxes or cases carrying said pipes, but located outside of and detachable from said casing, all substantially as specified.

In testimony whereof I have signed my name to this specification in the presence of two subscribing witnesses.

MAGNUS SWENSON.

Witnesses:
WILLIAM G. GIBBONS,
SAML. C. BIDDLE.